United States Patent
Wang et al.

(10) Patent No.: US 10,609,299 B1
(45) Date of Patent: Mar. 31, 2020

(54) METHOD OF MEASURING LIGHT USING DUAL CAMERAS

(71) Applicant: Black Sesame International Holding Limited, Santa Clara, CA (US)

(72) Inventors: Chao Wang, Shanghai (CN); Fangwei Cai, Shanghai (CN); Donghui Wu, San Mateo, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 0 days.

(21) Appl. No.: 16/254,273

(22) Filed: Jan. 22, 2019

Related U.S. Application Data (60) Provisional application No. 62/732,333, filed on Sep. 17, 2018.

(51) Int. Cl.
*H04N 5/235* (2006.01)
*H04N 5/247* (2006.01)

(52) U.S. Cl.
CPC ......... *H04N 5/2355* (2013.01); *H04N 5/2351* (2013.01); *H04N 5/247* (2013.01)

(58) Field of Classification Search
CPC ..... H04N 5/2355; H04N 5/247; H04N 5/2351
See application file for complete search history.

(56) References Cited

U.S. PATENT DOCUMENTS

| | | | | |
|---|---|---|---|---|
| 9,131,160 B2* | 9/2015 | Lin | ...................... | H04N 5/2353 |
| 2004/0218830 A1* | 11/2004 | Kang | ........................ | G06T 5/50 382/274 |
| 2005/0013501 A1* | 1/2005 | Kang | ........................ | G06T 5/50 382/254 |
| 2005/0030315 A1* | 2/2005 | Cohen | ..................... | G06T 11/60 345/538 |
| 2007/0242900 A1* | 10/2007 | Chen | ......................... | G06T 5/50 382/294 |
| 2010/0271512 A1* | 10/2010 | Garten | ..................... | G09G 5/06 348/239 |
| 2011/0211732 A1* | 9/2011 | Rapaport | .............. | G06F 3/1454 382/107 |
| 2012/0188392 A1* | 7/2012 | Smith | .................. | H04N 5/2355 348/222.1 |
| 2015/0312463 A1* | 10/2015 | Gupta | .................. | H04N 5/2352 348/239 |

* cited by examiner

*Primary Examiner* — Shahbaz Nazrul
(74) *Attorney, Agent, or Firm* — Timothy T. Wang; Ni, Wang & Massand, PLLC (57) ABSTRACT

A method of measuring lighting condition using dual cameras, having capturing a reference image, estimating a first minimum exposure target value, capturing a first plurality of minimum exposure value images, determining a first overall minimum exposure value, estimating a first maximum exposure target value, capturing a first plurality of maximum exposure value images, determining a first overall maximum exposure value of the first plurality of associated maximum exposure values and estimating a first dynamic exposure range as encompassing a first range having the first overall minimum exposure value as a first lower bound and the first overall maximum exposure value as a first upper bound.

15 Claims, 4 Drawing Sheets

METHOD OF MEASURING LIGHT USING DUAL CAMERAS

BACKGROUND

Technical Field

The instant disclosure is related to digital photography and more specifically to camera measuring lighting using two cameras.

Background

Merging multiple low-dynamic-range (LDR) images to render a high-dynamic-range (HDR) image is a high-quality camera feature. Deciding camera setting and more specifically the exposure and gain of the LDR images presents a major challenge. A dual camera system may use the secondary camera to measure lighting condition to decide primary camera control settings to output LDR images, optimized for a current scene.

SUMMARY

In one embodiment a method of measuring lighting condition using dual cameras, having at least one of capturing a reference image having a reference exposure value, estimating a first minimum exposure target value, capturing a first plurality of minimum exposure value images from the first minimum exposure target value to the reference exposure value having a first plurality of associated saturated pixels within the first plurality of minimum exposure value images and a first plurality of associated minimum exposure values, determining a first overall minimum exposure value of the first plurality of associated minimum exposure values based on the first plurality of associated saturated pixels within the first plurality of minimum exposure value images, estimating a first maximum exposure target value, capturing a first plurality of maximum exposure value images from the first maximum exposure target value to the reference exposure value having a first plurality of associated dark pixels within the first plurality of maximum exposure value images and a first plurality of associated maximum exposure values, determining a first overall maximum exposure value of the first plurality of associated maximum exposure values based on the first plurality of associated dark pixels within the first plurality of maximum exposure value images and estimating a first dynamic exposure range as encompassing a first range having the first overall minimum exposure value as a first lower bound and the first overall maximum exposure value as a first upper bound.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
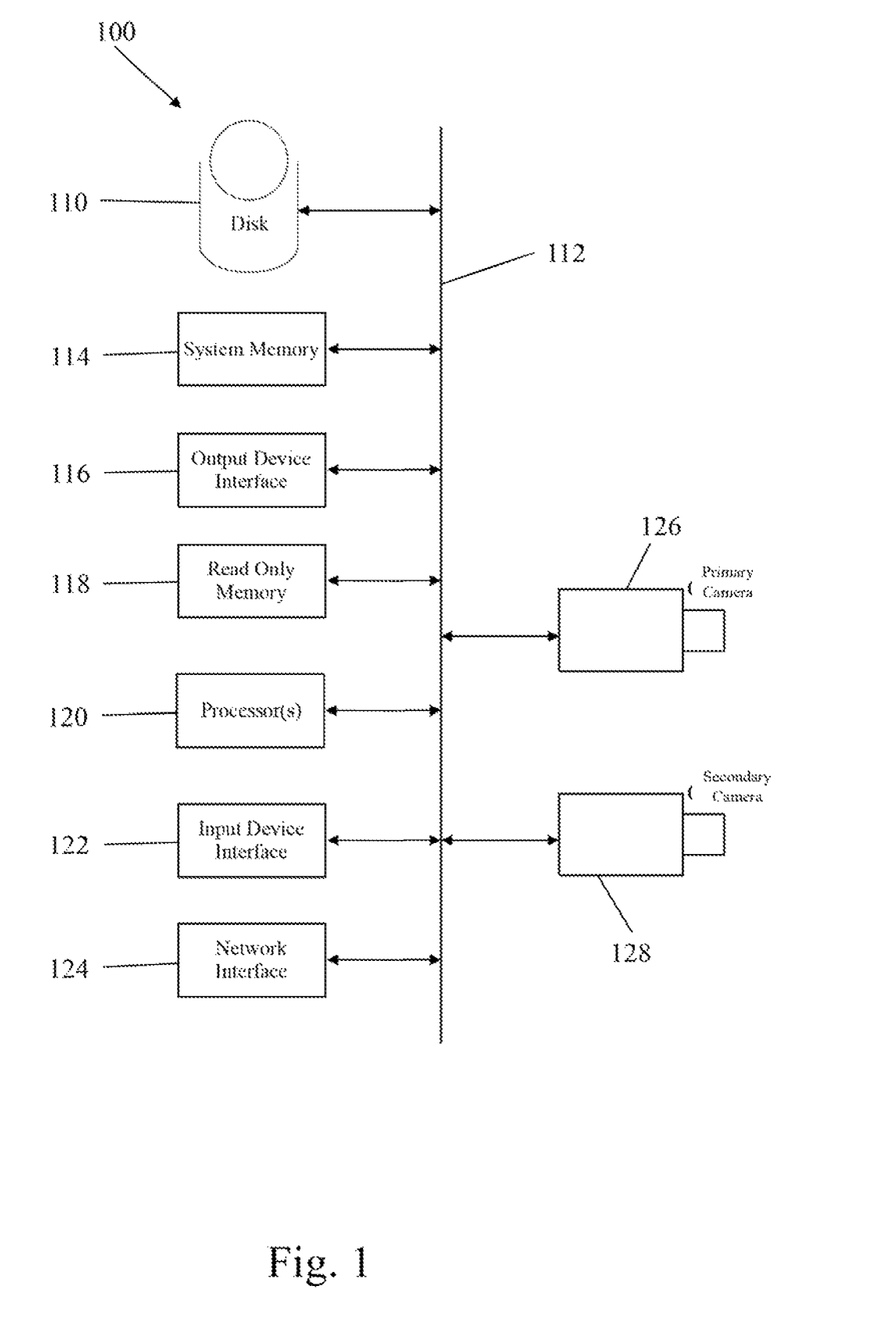
FIG. 1 is a system diagram in accordance with one embodiment of the disclosure.

FIG. 1 depicts an example electronic system for use in connection with a system having dual cameras. Electronic system 100 may be a computing device for execution of software associated with the operation of one or more portions or steps of process 400, or components and processes provided by FIG. 4. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to the auto focus camera module sensor 26 (primary camera) and the fixed focus camera module 128 (secondary camera).

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, auto focus camera module sensor 126 (primary camera) and fixed focus camera module 128 (secondary camera).

From these various memory units, processor(s) 120 retrieves instructions to execute and data to process in order to execute the processes of the subject disclosure. The processing unit(s) may be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such as a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or WiFi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 may be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) may be received from the client device at the server.

In this document the terms saturated pixel and highlight pixel will be used synonymously as describing a pixel that has recorded incident irradiation having an image intensity value that has reached a maximum value. The term dark, black or noisy pixel will be used synonymously as describing a pixel which has not received an amount of recorded incident irradiation to effectively distinguish it from pixel noise.

A common commercial image sensor having a low dynamic range (LDR) camera captures an image with a limited dynamic range, for example, 60-70 dB. Often, natural scenes cover 100-120 dB of dynamic range or ever higher. Thus, an LDR camera may either lose highlight content with saturated pixels or content in the shadows with dark, black or noisy pixels. One method used to capture a scene with a high dynamic range using a low dynamic range camera, is to capture the scene several times with different exposure values (EV). Exposure values are a relative ratio applied to the preview (or reference) exposure/gain in the logarithmic domain. The capture of a scene with multiple exposure values allows the capture of both highlights and shadows. This disclosure will describe various example solutions of image fusion to give a composite single resultant image, which captures a natural scene while still retaining an image depicting both highlights and shadows.

While previewing a video using a single low dynamic range camera, there is little chance to estimate the most suitable EV values from a current video stream, because the behavior of the saturated regions is difficult to estimate while decreasing EV values. Additionally, shadow regions are also difficult to estimate because of the lower signal-to-noise ratio (SNR) and the non-linearity of the sensor output in the dark end of a single captured image. One widely used method is to a manually define EV values which are then applied to the preview exposure/gain. However, these pre-defined EV values may not be adapted to the specific real scene.

In this disclosure, a dual camera system is utilized to estimate the EV values to capture a high dynamic scene. Dual camera systems may be found on many smart phones. Generally, when taking a photo with a dual camera system, the primary camera is predominantly utilized, while the secondary camera is less utilized. The field of view (FOV) of secondary cameras may be comparable to that of primary cameras, or, the secondary camera view may be cropped to match the primary camera view, thus the views of the two cameras are typically similar. Additionally, in many dual camera systems, the primary camera and secondary camera are synchronized with respect to brightness, i.e. luminance and color, i.e. chrominance, with the two cameras typically expressing limit differences with respect to luminance and chrominance.

If the secondary camera is well synchronized in brightness with the primary camera, EV values applied to the secondary camera may be applied to the primary camera. If the field of view is comparable, the difference in luminance between the cameras may be ignored.

In the very initial stage, a preset EV value sequence may be applied and the corresponding secondary image sequence may be captured. If there are N negative EV values which provide images darker than the reference image, P positive EV values which provide images brighter than the reference image and a zero EV value which is the same as the reference exposure, these images and their corresponding EV values may be denoted as, $I_i$, $EV_i$, i=-N, -(N-1), . . . , -1, 0, 1, 2, . . . P.

The brightness distribution or histogram of each image may be extracted with the original image resolution and bit depth, denoted as $Hist_{ij}$, i=-N, . . . , P, j=0, 1, 2, . . . , 255. For other resolutions and bit depths, a similar method may also be used.

The optimal shortest exposure may be the maximum exposure which provides details in highlight, generally with a minimum number of saturated pixels. The optimal longest exposure may be the minimum exposure which provides details in shadow, generally with the maximum number of almost dark pixels.

Figure 2:
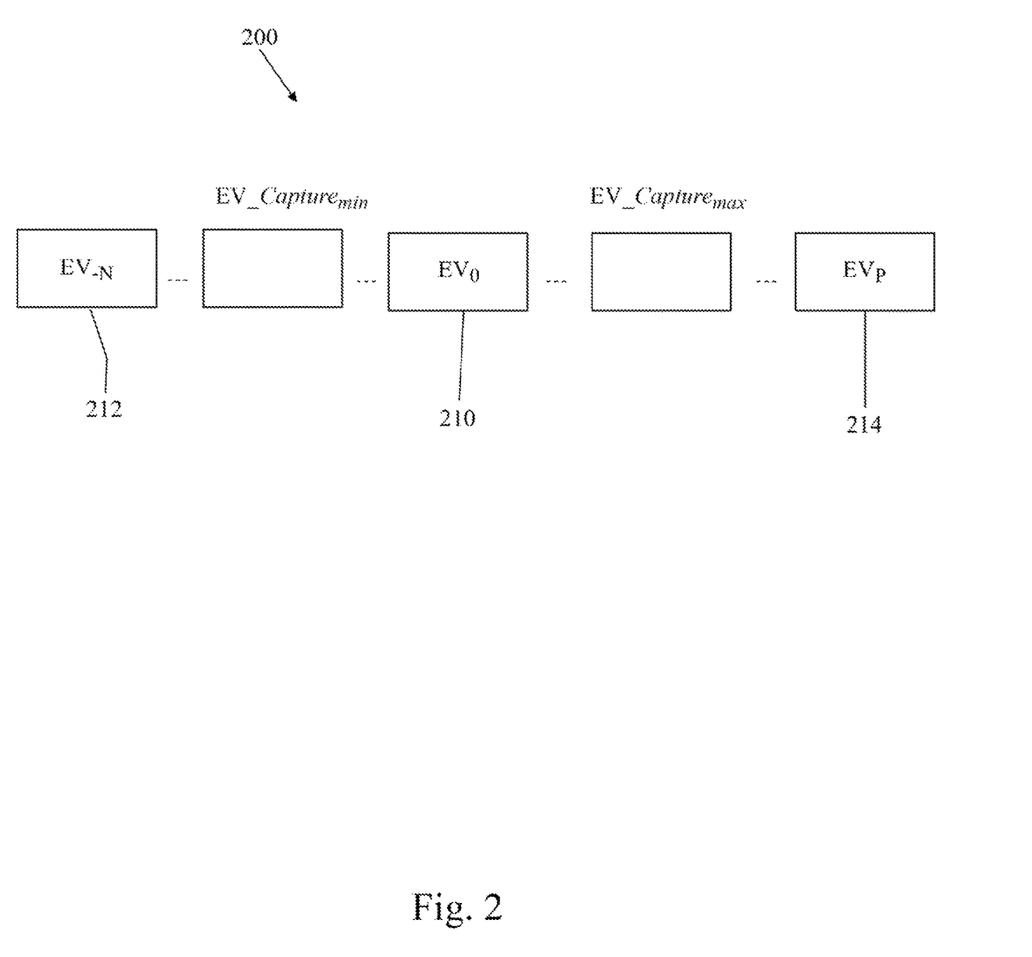
FIG. 2 is a depiction showing first exposure images in accordance with one embodiment of the disclosure.

One example implementation may comprise:
1. Searching the image from $EV_0$ FIG. 2, 210 to $EV_{-N}$, FIG. 2, 212, and finding the first image which has very few highlight pixels, the corresponding EV value denoted as $EV\_Capture_{min}$;
2. Searching the image from $EV_0$ FIG. 2, 210 to $EV_P$, FIG. 2, 214, and finding the first image which has very few shadow pixels, the corresponding EV value denoted as $EV\_Capture_{max}$; and
3. Determining the dynamic range from the results of step 1 and step 2, and segmenting the dynamic range into a series of EV values to be utilized by the primary camera to capture the LDR images.
4. If there are many highlighted pixels in $I_{-N}$ image, it may be due to the current measuring sequence not covering the brightest area of the scene. Then the shortest exposure with the smallest EV value in the current measuring sequence may be further decreased in the subsequent steps.
5. If there are many shadow pixels in $I_P$ image, it may be due to the current measuring sequence not covering the darkest area of the scene. Then the longest exposure with the greatest EV value in the current measuring sequence may be further increased in subsequent steps.
6. If the $EV\_Capture_{min}$ is not the shortest exposure in the current measuring sequence, then the current exposure may cover too much of the highlighted end of the EV spectrum. Thus the minimum EV value (i.e., -N in the current EV sequence) may be increased to better cover the highlighted areas in the next measuring EV sequence.
7. If the $EV\_Capture_{max}$ is not the longest exposure in the current measuring sequence, then the current exposure covers too much in the dark end of the EV spectrum. Thus the maximum EV value (i.e., P in the current EV sequence) may be decreased to better cover the shadow areas in the next measuring EV sequence.

A refined embodiment of the Step 1-7 is listed below.

The percentage threshold of highlight pixels (HighLightPerTh) and shadow pixels (DarkPerTh) may be set by a user. Find the Optimal Minimum EV Value in the Current Sequence:

Exposures shorter than the reference exposure should provide details in highlight. The shortest exposure should have few highlighted or almost saturated pixels. For each image that is not longer than the reference in the measuring sequence, the pixel number of those pixels that are brighter than a highlight threshold level are counted, (HighlightTh, e.g., 224@8 bit), denoted as $HighLightPixelCount_i$, i=0, . . . , -N. From 0 to -N, to find the first image that $$HighLightPixelCount_k \leq HighlightPerTh \times TotalPixelCount, \quad (1)$$

thus k is the possible optimal shortest exposure that may capture the highlight details of this scene, whose EV value is $EV_k$. If there is no image in the sequence that has few highlight pixels, the optimal dynamic range in the short exposure end in the current measuring sequence is $EV_{-N}$.

If k is not the reference exposure in the current EV sequence and $$HighLightPixelCount_k < HighlightPerTh \times TotalPixelCount,$$

then the measuring image $I_k$ is over-darkened, the EV value may be updated to provide the optimal minimum EV value. Now given $$HighLightPixelCount_k < HighlightPerTh \times TotalPixelCount$$

$$HighLightPixelCount_{k+1} > HighlightPerTh \times TotalPixelCount,$$

an optimal EV value $EV_{k'}$ may be found by linear interpolation and the corresponding image has a highlight pixel count approximated to the threshold.

$$EV_{k'} = EV_k + \frac{HighlightPerTh \times TotalPixelCount - HighlightPixelCount_k}{HighlightPixelCount_{k+1} - HighlightPixelCount_k} \times (EV_{k+1} - EV_k)$$

Figure 3:
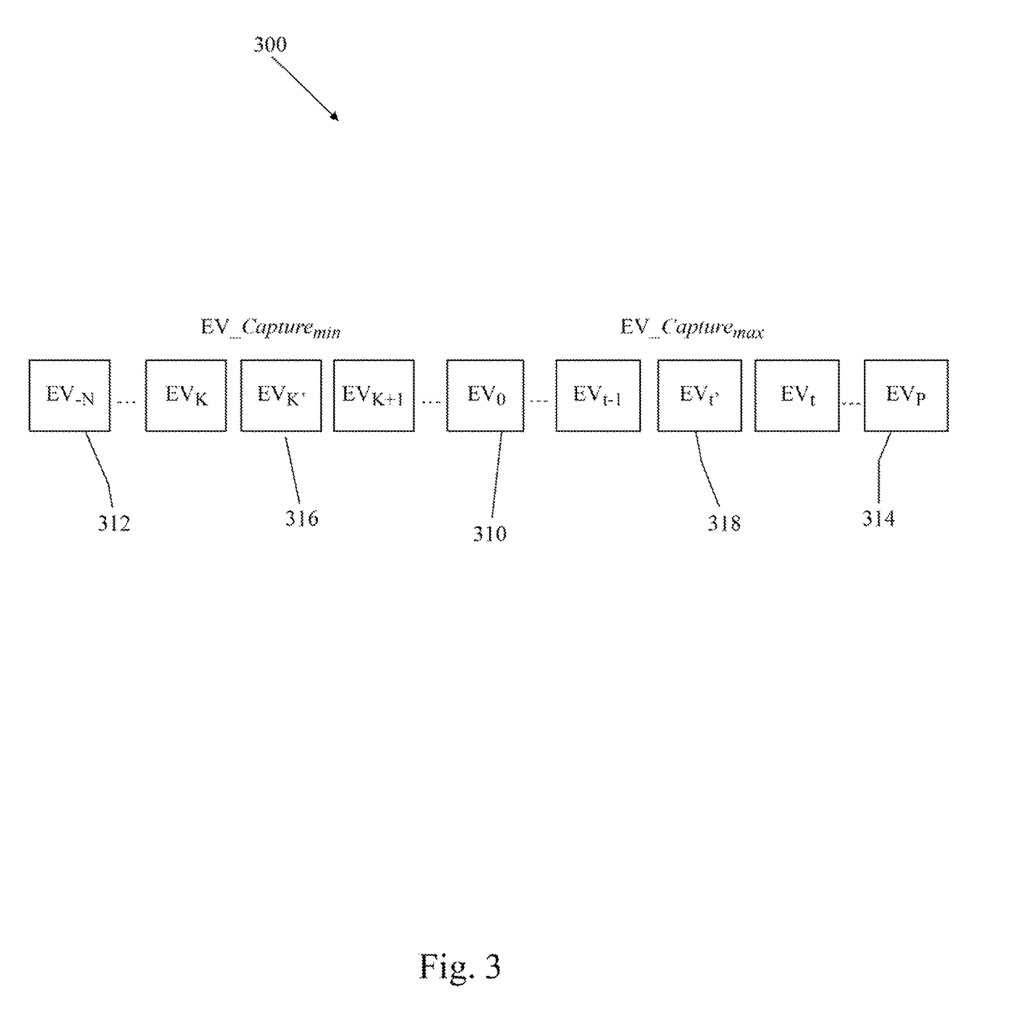
FIG. 3 is a depiction showing final exposure images in accordance with one embodiment of the disclosure.

Thus the value $EV_k$, or the refined value $EV_{k'}$, FIG. 3, 316, may be adopted as the optimal minimum EV value.

Find the Optimal Maximum EV Value in the Current Sequence:

Exposures longer than the reference exposure should provide details in shadow. The longest exposure should have few shadow or almost dark pixels. For each image that is not shorter than the reference in the measuring sequence, those pixels that are darker than a shadow threshold level are counted (DarkTh, e.g., 32@8 bit), denoted as $DarkPixelCount_i$, i=0, . . . , P. From 0 to P, to find the first image that $$DarkPixelCount_t \leq DarkPerTh \times TotalPixelCount, \quad (2)$$

thus t is the possible optimal longest exposure that can capture the shadow details of this scene, whose EV value is $EV_t$, FIG. 3, 316. If there is no image in the sequence that has few dark pixels, the optimal dynamic range in the long exposure end in the current measuring sequence is $EV_P$.

If t is not the reference exposure in the current EV sequence and $$DarkPixelCount_t < DarkPerTh \times TotalPixelCount,$$

then image $I_t$ is over-saturated and the EV value for the optimal maximum EV value may be updated. Now given $$DarkPixelCount_t < DarkPerTh \times TotalPixelCount$$

$$DarkPixelCount_{t-1} > DarkPerTh \times TotalPixelCount,$$

an optimal EV value $EV_{t'}$ may be found by linear interpolation having a corresponding image that has a highlight pixel count approximated by the threshold.

$$EV_{t'} = EV_t + \frac{DarkPerTh \times TotalPixelCount - DarkPixelCount_t}{DarkPixelCount_{t-1} - DarkPixelCount_t} \times (EV_{t-1} - EV_t)$$

Thus the value $EV_t$ or the refined value $EV_{t'}$, is adopted as the optimal maximum EV value.

Find the Optimal EV Sequence for the Next Capture:

With the minimum EV value $EV_k$ or $EV_{k'}$ and the maximum EV value $EV_t$ or $EV_{t'}$, the exposure range is set for the primary camera with the low dynamic range captured images. In the low dynamic range image merging algorithm, limitation are set, for example, a maximum EV interval limitation due to the signal to noise ratio drop between neighboring exposures and a minimum EV interval limitation to avoid excessive redundant information and ghost motion.

If there are neighboring EV value within an interval [1.0, 2.0].

First, the number of images of shorter exposures than the reference, negative EV values, are determined by, $$N_{negative} = \text{ceiling}\left(\frac{-EV_k}{2.0}\right)$$

and the EV interval may be set as $$Interval_{negative} = \max\left(1.0, \frac{(-EV_k)}{N_{negative}}\right)$$

Exposures shorter than the reference image should have EV values set as $$EVNegative_i = 0 - i * Interval_{negative}, i=0, \ldots, N_{negative}$$

Similarly, for the number of images of exposures longer than the reference, the EV interval may be found from $$N_{positive} = \text{ceiling}\left(\frac{EV_t}{2.0}\right)$$

$$Interval_{positive} = \max\left(1.0, \frac{(EV_t)}{N_{positive}}\right)$$

$$EVPositive_i = i * interval_{positive}, i = 0, \ldots, N_{positive}$$

Additionally, the reference EV=0.

Find the Optimal EV Sequence for the Next Measurement Sequence:

In measuring the EV, it is initialized by a pre-defined sequence. In the short exposure end and the long exposure end, the current measuring sequence may over-take or under-take the real scene.

To insure that the measuring sequence has sufficient differences in exposure with minimal redundant information, then the EV difference between neighboring two EV values may be within [1.0, 2.0].

If there are still a significant number of highlighted pixels in the darkest image, i.e., $$HighLightPixelCount_{-N} > HighlightPerTh \times TotalPixelCount$$

if the measured sequence cannot cover the highlight area, then the shortest exposure may be further decreased. Due to the fact that the highlight pixels' behavior cannot be estimated when the exposure is decreased, such a decrease may be implemented step by step, for example, the shortest exposure may be decreased in 1 EV increments.

In the other cases, where there are few highlight pixels in the darkest image, the shortest exposure of the measuring sequence may be selected as the same as $EVCapture_{min}$.

Given the minimum exposure in the next measuring sequence, to set the measuring sequence EV values at the short exposure end, a similar method is utilized to the capture EV.

If there are still a significant number of dark pixels even in the brightest image, i.e., $$DarkPixelCount_P > DarkPerTh \times TotalPIxelCount$$

then the measuring sequence cannot cover the dark area. The longest exposure may be further brightened and the longest EV may be increased. Because dark pixels' nonlinear behavior cannot be well estimated when the exposure is increased, such an exposure extension may be implemented step by step, with the longest exposure increased in increments of 1 EV.

In the other cases, if there are only few dark pixels in the brightest image, the longest exposure of the measuring sequence may be selected as the same as $EVCapture_{max}$.

Given the maximum exposure in the next measuring sequence, setting the measuring sequence of EV values in the long exposure end is similar to the captured EV.

Figure 4:
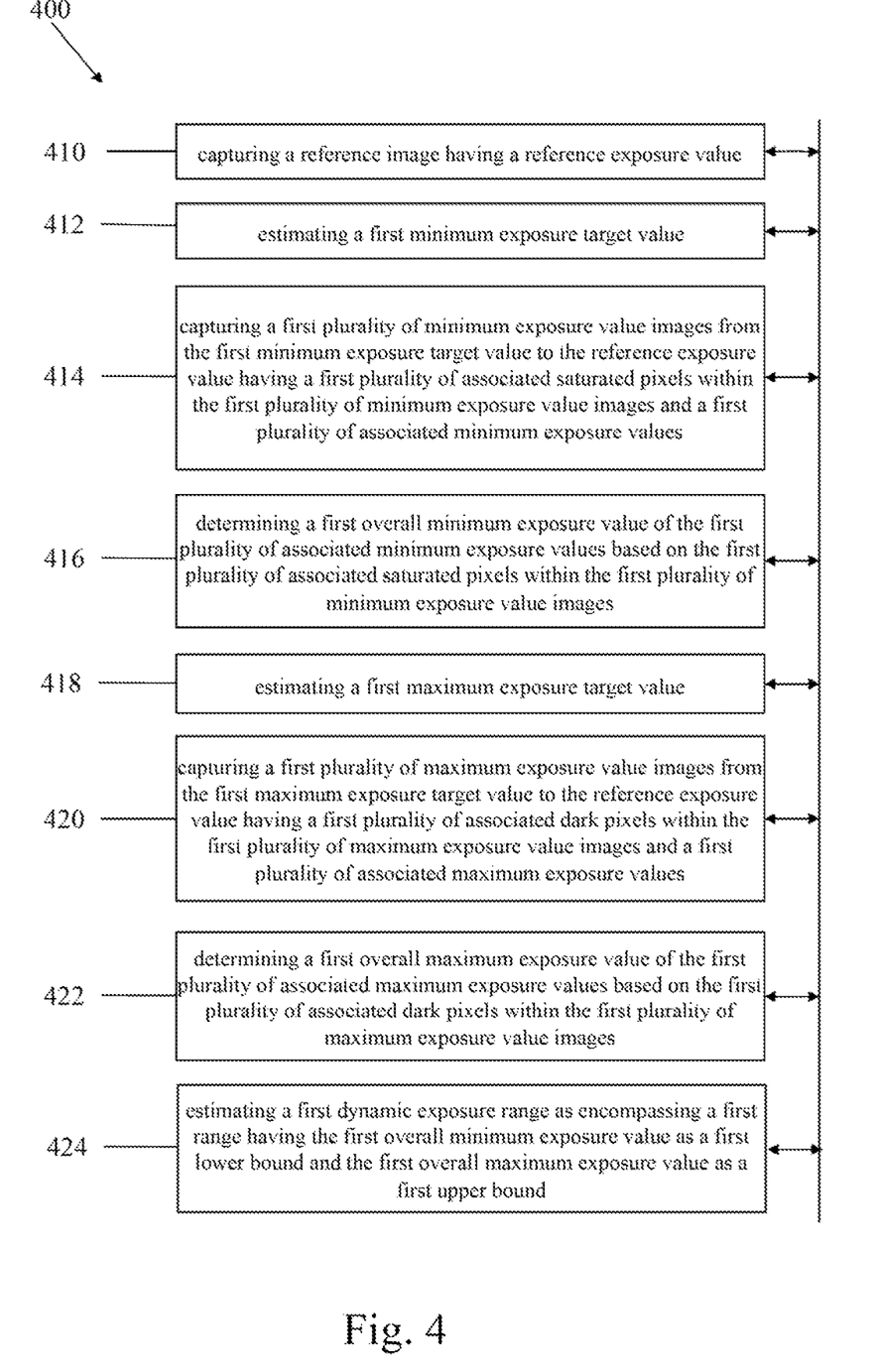
FIG. 4 is a depiction of a method of measuring lighting conditions using a secondary camera in accordance with one embodiment of the disclosure.

FIG. 4 depicts one method of a method of measuring lighting condition using dual cameras, comprising, capturing 410 a reference image having a reference exposure value, estimating 412 a first minimum exposure target value and capturing 414 a first plurality of minimum exposure value images from the first minimum exposure target value to the reference exposure value having a first plurality of associated saturated pixels within the first plurality of minimum exposure value images and a first plurality of associated minimum exposure values. The method also includes determining 416 a first overall minimum exposure value of the first plurality of associated minimum exposure values based on the first plurality of associated saturated pixels within the first plurality of minimum exposure value images and estimating 418 a first maximum exposure target value. The method further comprises capturing 420 a first plurality of maximum exposure value images from the first maximum exposure target value to the reference exposure value having a first plurality of associated dark pixels within the first plurality of maximum exposure value images and a first plurality of associated maximum exposure values, determining 422 a first overall maximum exposure value of the first plurality of associated maximum exposure values based on the first plurality of associated dark pixels within the first plurality of maximum exposure value images and estimating 424 a first dynamic exposure range as encompassing a first range having the first overall minimum exposure value as a first lower bound and the first overall maximum exposure value as a first upper bound.

Another example method of measuring light using dual cameras comprises capturing a sequence of images with different exposure values using a secondary camera, an optimal dynamic range from within the current sequence is chosen by the dark pixel and highlight pixels histogram for different exposure values. The exposures below the reference image and higher than the reference image are determined for the primary camera and an optimal measuring sequence for the secondary camera is estimated for subsequent measurements.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of measuring lighting condition using dual cameras, comprising:
    capturing a reference image having a reference exposure value;
    estimating a first minimum exposure target value;
    capturing a first plurality of minimum exposure value images from the first minimum exposure target value to the reference exposure value having a first plurality of associated saturated pixels within the first plurality of minimum exposure value images and a first plurality of associated minimum exposure values;

determining a first overall minimum exposure value of the first plurality of associated minimum exposure values based on the first plurality of associated saturated pixels within the first plurality of minimum exposure value images;

estimating a first maximum exposure target value;

capturing a first plurality of maximum exposure value images from the first maximum exposure target value to the reference exposure value having a first plurality of associated dark pixels within the first plurality of maximum exposure value images and a first plurality of associated maximum exposure values;

determining a first overall maximum exposure value of the first plurality of associated maximum exposure values based on the first plurality of associated dark pixels within the first plurality of maximum exposure value images; and estimating a first dynamic exposure range as encompassing a first range having the first overall minimum exposure value as a first lower bound and the first overall maximum exposure value as a first upper bound.

2. The method of measuring lighting condition using dual cameras of claim 1 further comprising determining whether a minimum percentage of saturated pixels of the first overall minimum exposure value exceeds a predetermined maximum saturated pixel value and if the first overall minimum exposure value exceeds the predetermined maximum saturated pixel value estimating a second overall minimum exposure target value.

3. The method of measuring lighting condition using dual cameras of claim 2 further comprising setting a final overall minimum exposure value as a lesser of the first overall minimum exposure value and the second overall minimum exposure target value.

4. The method of measuring lighting condition using dual cameras of claim 2 wherein the second overall minimum exposure target value is interpolated based on a percentage of the first plurality of associated saturated pixels.

5. The method of measuring lighting condition using dual cameras of claim 3 further comprising determining whether a minimum percentage of dark pixels of the first overall maximum exposure value exceeds a predetermined maximum dark pixel value and if the first overall maximum exposure value exceeds the predetermined maximum dark pixel value estimating a second overall maximum exposure target value.

6. The method of measuring lighting condition using dual cameras of claim 5 wherein the second overall maximum exposure target value is interpolated based on a percentage of the first plurality of associated dark pixels.

7. The method of measuring lighting condition using dual cameras of claim 5 further comprising setting a final overall maximum exposure value as a higher of the first overall maximum exposure value and the second overall maximum exposure target value.

8. The method of measuring lighting condition using dual cameras of claim 7 further comprising estimating a final dynamic exposure range as encompassing a final range having a final overall minimum exposure value as a final lower bound and a final overall maximum exposure value as a final upper bound.

9. The method of measuring lighting condition using dual cameras of claim 8 wherein the final dynamic exposure range is utilized by a primary camera.

10. The method of measuring lighting condition using dual cameras of claim 9 further comprising
segmenting the first dynamic exposure range into a plurality of exposure values; and
capturing a plurality of primary camera images utilizing the primary camera, each of the plurality of primary camera images utilizing one of the plurality of exposure values.

11. The method of measuring lighting condition using dual cameras of claim 1 wherein a saturated pixel has a saturated image intensity value that is greater than a predetermined maximum value and a darkened pixel has a darkened image intensity value that is less than a predetermined minimum value.

12. The method of measuring lighting condition using dual cameras of claim 1 wherein a secondary camera is utilized to capture the reference image, the first plurality of minimum exposure value images and the first plurality of maximum exposure value images.

13. The method of measuring lighting condition using dual cameras of claim 1 wherein the first dynamic exposure range is utilized by a primary camera.

14. The method of measuring lighting condition using dual cameras of claim 1 further comprising
determining a histogram of the reference image;
determining a percentage of saturated pixels of the reference image based on the histogram;
determining a percentage of dark pixels of the reference image based on the histogram;
wherein the estimating the first minimum exposure target value is based on the percentage of saturated pixels of the reference image; and
wherein the estimating the first maximum exposure target value is based on the percentage of dark pixels of the reference image.

15. The method of measuring lighting condition using dual cameras of claim 1 further comprising
segmenting the first dynamic exposure range into a plurality of exposure values; and
capturing a plurality of primary camera images utilizing a primary camera, each of the plurality of primary camera images utilizing one of the plurality of exposure values.

* * * * *